July 31, 1956 R. R. LEFFLER 2,757,012
GOLF CART HAVING CLUB RECEIVING COMPARTMENTS
Filed April 14, 1953 4 Sheets-Sheet 1

July 31, 1956

R. R. LEFFLER 2,757,012

GOLF CART HAVING CLUB RECEIVING COMPARTMENTS

Filed April 14, 1953

Inventor.
Ralph R. Leffler.
By Wilkinson, Huxley, Byron & Hume
Attys.

July 31, 1956 R. R. LEFFLER 2,757,012
GOLF CART HAVING CLUB RECEIVING COMPARTMENTS
Filed April 14, 1953 4 Sheets-Sheet 4
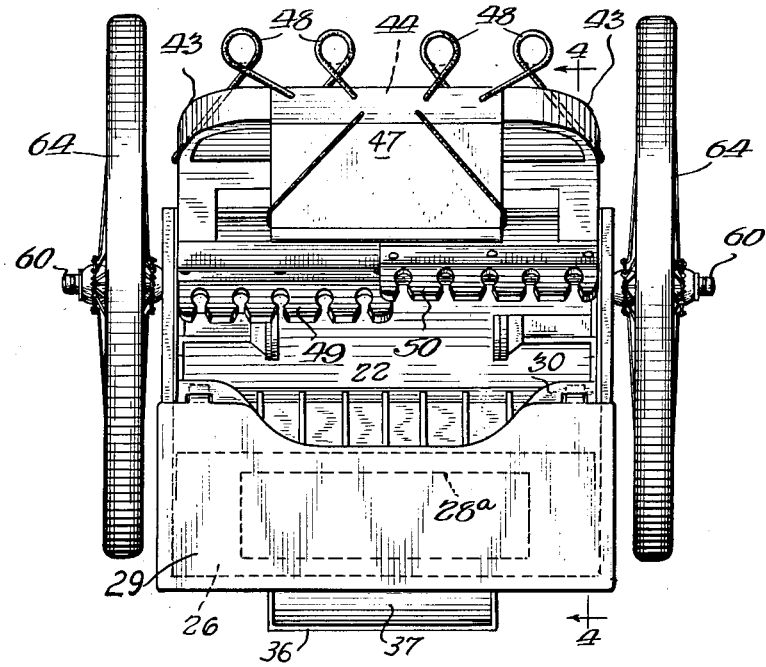
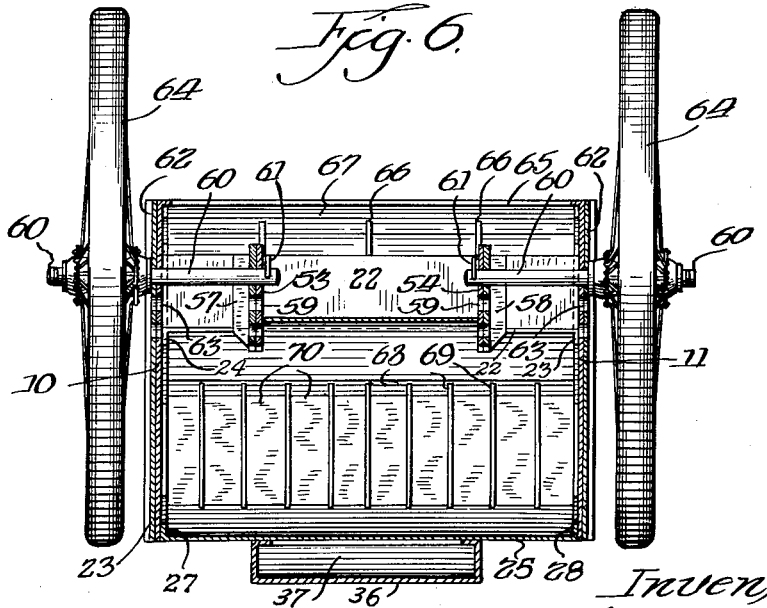
Inventor:
Ralph R. Leffler United States Patent Office 2,757,012
Patented July 31, 1956

2,757,012

GOLF CART HAVING CLUB RECEIVING COMPARTMENTS

Ralph R. Leffler, Chicago, Ill.

Application April 14, 1953, Serial No. 348,771

4 Claims. (Cl. 280—47.19)

My invention relates to a golf club caddy cart and has for its principal object the provision of a caddy cart for the transportation of a set of golf clubs during the playing of golf on a golf course, and provides a caddy cart which will carry a complete set of iron and wood clubs in balanced relation in the cart so the cart is stable and, when being drawn, the weight of the cart and clubs is supported by the caddy cart wheels and not by the player as he pulls the cart.

Another object of my invention is the provision of a caddy cart which consists primarily of two compartments, in one of which the wood clubs are carried, while the iron clubs are carried in another compartment, with stub axles placed between the compartments upon which wheels are mounted, thereby providing a balanced arrangement for the caddy cart when loaded with golf clubs which cannot be easily overturned and which, when being pulled behind the player, is almost wholly supported upon the wheels, and when the player releases the caddy cart while it is being pulled in its normal inclined position, the cart will assume a vertical position due to the fact that the center of gravity is slightly to one side of the stub axles only slightly above its axis of rotation about the axles so that when the cart is released it assumes a stable vertical position.

Another and further object of my invention is the provision of a caddy cart in which the compartments are so arranged that the clubs are placed in the compartments with the clubheads at the lower part of the caddy cart instead of the upper part, as is usual in these caddy carts, thereby lowering the center of gravity when the cart is loaded with clubs and securing a balanced relation of the caddy cart, and counter-balancing the cart about the axle so that the cart is not easily overturned and, unless tilted to an abnormal degree, will return to its original vertical position unless accidentally moved to a position about the axles beyond that which is necessary in pulling the caddy cart, or in other uses of it.

Another and further object of my invention is the provision of a caddy cart which is substantially balanced when a set of golf clubs is divided and placed both in front of and behind its stub axles, thereby providing a stability in the vertical position of the cart which is not easily disturbed by being accidentally moved by the player or is not easily upset by the force of a strong wind blowing across the course, and when tilted about its horizontal axis of rotation into normal pulling position the cart automatically returns to its normal standing position because its center of gravity is to one side and slightly above its axis of horizontal rotation.

Another and further object of my invention is the provision of a caddy cart which is intended to be moved manually by the player during the playing operations and which, upon being tilted in a forward direction, is moved upon the axles as a pivotal point of the structure to such an extent that the lower portion of the compartment is lifted clear of the ground, so that the entire weight of the cart and contents is carried by the axles, and in pulling the cart the body of the cart is rotated only a short distance. When the player releases the caddy cart it automatically tilts away from the user to a vertical position, where the weight of the cart is supported by the lower ends of the side panels of the cart as well as the wheels and the clubs are retained in vertical position without any attention on the part of the player.

Another and further object of my invention is the provision of a caddy cart in which a balanced relation of the cart is maintained at all normal times and with the shafts of the clubs having the grips thereon in a top position so that when the clubs are removed from the caddy cart the player does not have to reverse the position of the clubs before using them, and after using a club it is returned to the cart in its proper position without the necessity of again reversing the club, thus adding materially to the convenience of the caddy cart in use.

Another and further object of my invention is the provision of a golf cart which is so constructed and designed that a seat portion is provided on the cart at a sufficient height above the ground so that the player can sit upon it in a relaxed position and in so doing slightly shifts the position of the caddy cart so that the weight of the player is sustained by the portion of the frame of the cart in contact with the ground, thereby firmly anchoring the cart upon the ground and shifting the major portion of the weight of the player from the axles of the cart to the frame to such an extent that the wheels rest only very lightly upon the turf or ground, thereby insuring that the cart will not roll away from the player and providing a firm seat upon which the player may rest, even to the point of leaning backwards where support can be had to the player's back and shoulders by the upper part of the frame of the cart, thus insuring that the cart remains firmly in engagement with the ground so the player seated therein is not thrown from the cart which might result in injury to the player and damage to the cart.

These and other objects of my invention will be more fully and better understood by reference to the accompanying drawings, and in which—

Fig. 4 is a vertical view partially in elevation and partially in section on lines 4, 4 of Fig. 5;

Fig. 5 is a top plan view of my improved caddy cart and

Fig. 6 is a transverse sectional view taken on lines 6, 6 of Fig. 2.

Figure 1:
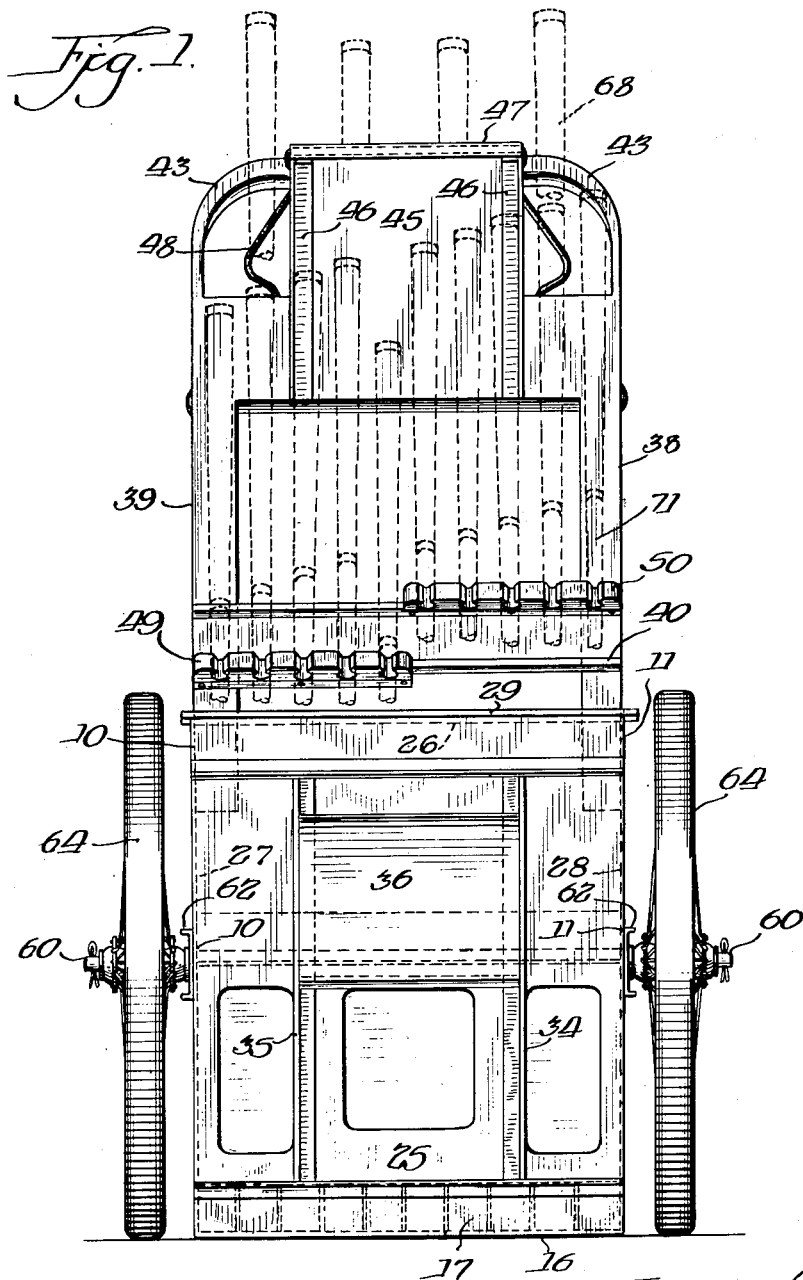
Fig. 1 is a front elevational view of my improved cart.
Figure 2:
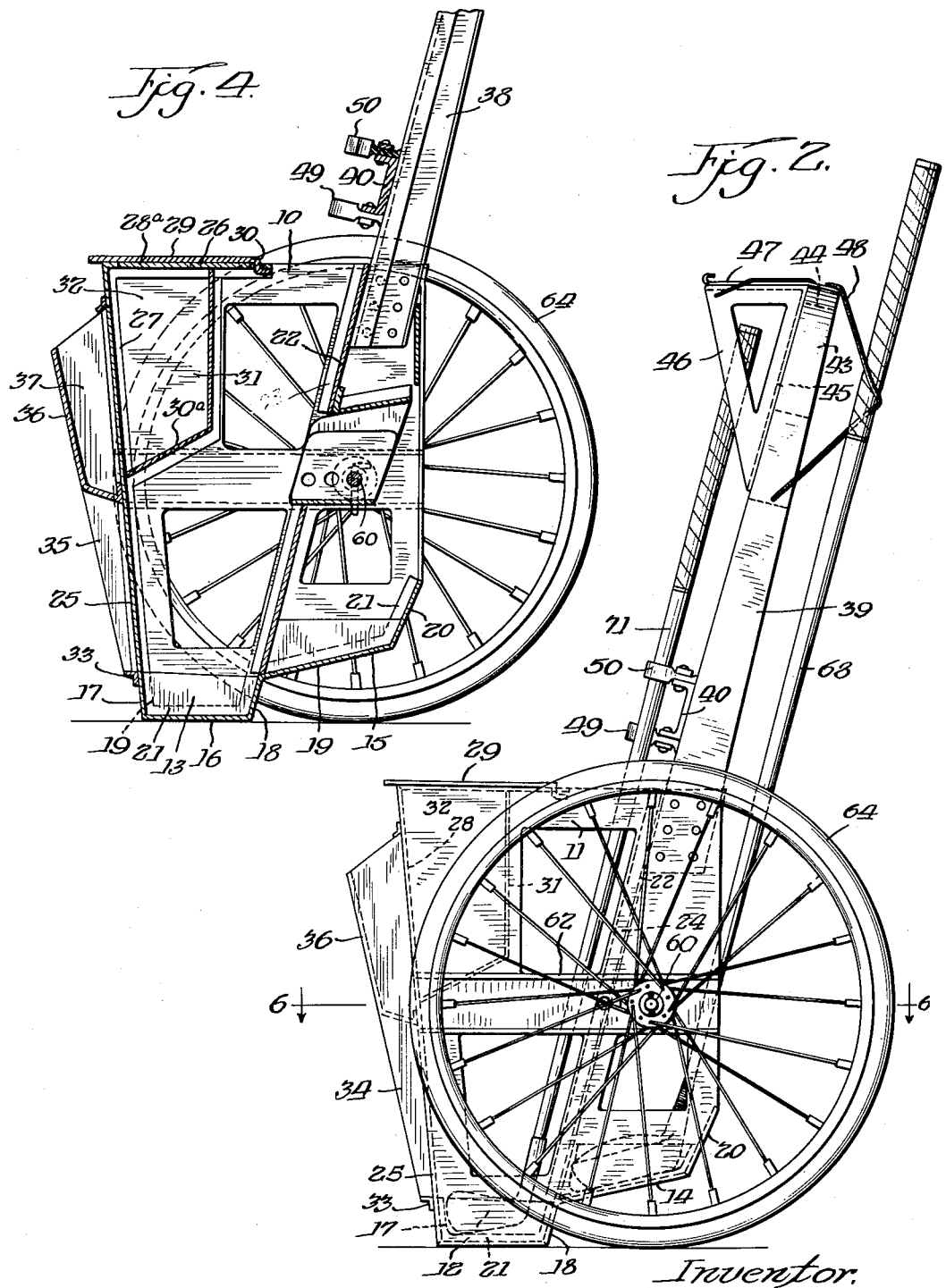
Fig. 2 is a side elevation of the cart shown in Fig. 1.
Figure 3:
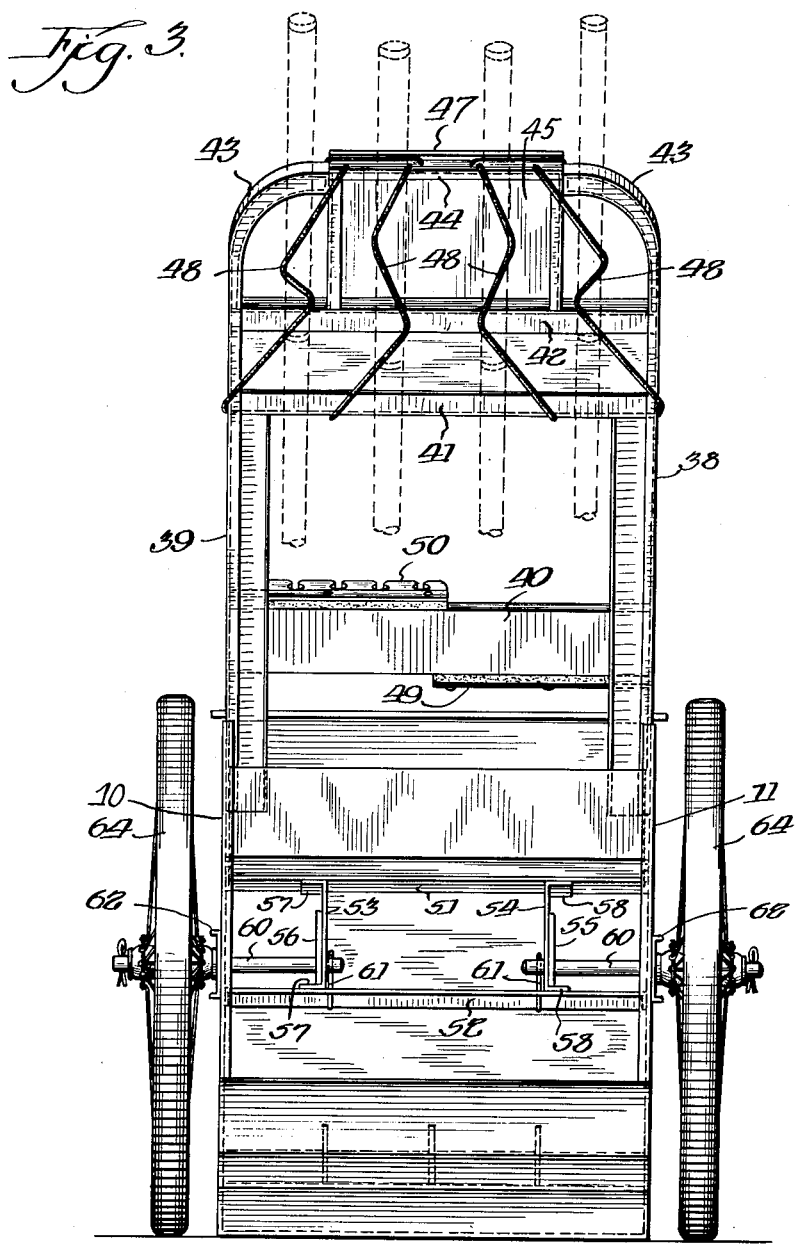
Fig. 3 is a rear elevation of the cart shown in Figs. 1 and 2.

Referring now specifically to the drawings, and in which like reference characters refer to like parts throughout, a golf cart is shown consisting of side panels 10 and 11, generally rectangular in shape, and having cut-outs therein to ease construction and to lessen the weight of the cart, and are slightly wider at their tops than at their bottoms. The side panels 10 and 11 are cut away at one of their sides thereby producing end portions 12 and 13 which project below the angular offset edges 14 and 15 along the cut away sides of the panels 10 and 11, the inclined edges 14 and 15 on the panels 10 and 11 being angularly extended and upwardly inclined so that when the cart is tilted in a clockwise direction (Figs. 2 and 4) at an angle for pulling purposes, the edges 14 and 15 of the side panels 10 and 11 do not come in contact with the ground over which the cart is being pulled. A bottom member 16 is provided which is shaped to conform to the projecting lower ends 12 and 13 of the panels 10 and 11 and has a turned-up edge portion 17 at one of its sides along the lower ends which extends alongside of the projections 12 and 13, with an upturned portion 18 at the opposite side of the projections 12 and 13 and an inclined angular portion 19 with an upturned angular edge portion 20 with flanges 21, 21 being provided integrally formed at each of the ends of the bottom member 16 against which the side panels 10 and 11 are positioned, with the side panels 10 and 11 and the bottom 16 being riveted or spot-welded together, the bottom member 16 forming compartments for the golf clubs as will be more fully described hereinafter. A center plate 22 is provided which has flanges 23 and 24 along each of its side edges which are fitted against the side panels 10 and 11 and either riveted or spot-welded thereto so as to be held firmly in position, with the center plate 22 providing a separator for two compartments on each side of the axles of the golf cart within which the golf clubs are positioned and carried while being transported in the cart.

An inverted L-shaped member is provided having a front panel 25 and a top panel 26—this L-shaped member having flanges 27 and 28 formed thereon which, in turn, are fitted against the side panels 11 and 12 along their outer inclined edges and riveted or spot-welded thereto, so that in effect a rectangular enclosure is formed for carrying golf clubs and other equipment used by the player in playing golf. The top panel 26 has an opening 28ª therein with a hinged seat 29 being connected to the top panel 26 by having an offset rear edge inserted through a slot 30 adjacent the marginal edge of the top panel 26. A plate having a bottom portion 30ª which is angularly disposed with respect to the front panel 25 and extends inward therefrom is provided having a vertical wall portion 31, with flanges on the said plate spot-welded to the side panels 10 and 11 and provides a compartment 32 within which a rain jacket, sweater, or the like, or auxiliary golf clothing can be carried, which is placed into and removed from the compartment 32 through the opening 28 in the top panel 26. The lower edge of the front panel 25 is placed in abutting relation with the upper edge of the upturned portion 17 of the bottom 16, with an angle 33 extending thereacross and a pair of vertical stiffening members 34 and 35 being secured to the outer face of the front panel 25 for support purposes and also for stiffening the front panel to provide support for the panel 25 and sustain the weight of a person when seated upon the seat 29. A plate 36 is secured between the members 34 and 35 which provides a compartment 37 at the front of the front panel 25 within which golf balls and other auxiliary equipment may be carried, if desired, by the user of the caddy cart.

The front panel 25 is outwardly inclined with respect to the vertical axis of the cart so that the weight of a person seated upon the seat 29 is offset with respect to the vertical axis of the cart and the weight of the person upon the seat 29 causes a slight tilting of the cart in a counter-clockwise direction (Figs. 2 and 4) so that the bottom 16, which is connected to the projections 12 and 13 of the panels 10, is brought securely into engagement with the ground or a floor upon which the cart is positioned and rests firmly upon the ground with only a small portion of the weight resting upon the wheels. The cart, therefore, when one is seated upon it, cannot be easily rolled over the ground or displaced out of position, and the forward angular edge of the bottom 16 will firmly engage into the turf, making the cart safe to be used as a seat without danger of the cart rolling when a player is seated upon it, resulting in a fall to the player or in his being thrown from the cart.

A pair of handles 38 and 39 is provided which have their lower ends riveted or spot-welded to the side panels 10 and 11 and project upwardly therefrom at a slight angle to a vertical axis of the cart and have a plurality of braces 40, 41 and 42 extending across the space between these handles 38 and 39, with the handles 38 and 39 having curved portions 43, 43 which extend towards each other at their upper ends and having a connecting member 44 secured thereto—the curved portions 43, 43 providing grips for pulling the cart by the player.

A plate 45 is provided having brackets 46, 46 at each of its sides which are secured to the cross brace 42 and connecting member 43 and has a plate 47 mounted thereon providing a flat surface upon which a score card or the like may be secured in any approved manner. A plurality of cords 48, 48 is provided which may be elastic, if desired, which are secured at their lower ends to the cross brace 41 and at their upper ends to the connecting member 44. These cords have enough slack or elasticity therein to be looped about the grips of one group of golf clubs carried by the caddy cart and hold the clubs in a vertical position during the time when the clubs are being transported. On the opposite side of the cart, golf club shaft holders 49 and 50 are mounted on the cross brace 40 and have slots therein into which the shafts of the golf clubs carried on that side of the caddy cart may be placed.

A pair of cross braces 51 and 52 is provided which are secured to the side panels 10 and 11 at their ends and have brackets 53 and 54 secured to the cross braces 51 and 52 respectively, with reinforcing plates 55 and 56 being provided, the brackets 53 and 54 having flanges 57 and 58 thereon fitted against the cross braces 51 and 52 and welded or bolted thereto, with a plurality of openings 59, 59 being provided which extend through the braces 53 and 54 and also through the reinforcing plates 55 and 56 in registering relation with each other and which have stub axles 60, 60 mounted therein, with cotter pins 61, 61 extending through the ends of the stub axles 60, 60 so as to hold the stub axles 60, 60 in position on the caddy cart. Longitudinal reinforcing members 62, 62 are riveted or spot-welded to the side panels 10 and 11 and have openings 63, 63 therein, with corresponding registering openings being provided in the side panels 10 and 11—the openings in the reinforcing members and in the side panels being in registered relation with each other and in register with the spaced openings 59, 59 in the braces 53 and 54, and 55 and 56, with wheels 64, 64 being mounted on the outer ends of the axles 60, 60 in the usual fashion and which support the caddy cart when it is being transported from one place to another during the playing of the game of golf or for any other purpose which may be desired when the caddy cart is being pulled over the ground.

In the compartment formed by the portion of the bottom 14 and upturned portion 20, a liner 65 is provided having separators 66, 66 therein and which comprise compartments 67, 67 within which the heads of wood golf clubs, preferably such as 68, are positioned, with the angle of the portion 14 conforming generally to the angle of the sole of wood golf clubs, with the compartments 67, 67 being four in number to accommodate four wood golf clubs placed in position in the cart and to the rear side of the axles which support the cart on the wheels.

In front of the stub axles, the compartment formed by the projecting sides 12 of the side panels and the bottom member 16 has a liner 68 therein within which separators 69, 69 are placed in spaced relation with each other providing compartments 70, 70 (preferably ten in number) to conform to the usual number of iron golf clubs making up the usual player's set and into which the heads of iron golf clubs, such as 71, are placed, with their heads downward and shafts extending upward and fitted into one of the slots in the golf club holders 49 and 50, so that these clubs are held in position to be easily removed from the cart and in position for use without the ends being reversed as is common when golf clubs are removed from a golf bag carried on the usual caddy cart. The major portion of the weight of the cart when fully loaded with a complement of clubs as enumerated above below the axles is in front of the axles or toward the seat portion of the cart. However the axles are mounted at a point above the lower end approximately one-quarter of the total height of the cart and because in the normal standing position of the cart the clubs, holding compartments and handles are inclined approximately 10°, the weight of the cart below the axles is partially counterbalanced by the part of the cart above the axles. The center of gravity of the cart and clubs changes with the number of clubs carried and other playing equipment carried by a cart, including an umbrella, but is always slightly above and also slightly toward the front of the cart (or toward the seat portion) and shifts as the cart is rotated upon the axles for pulling purposes. The inclination of the cart for normal pulling purposes is from about 27° to 20°. The cart can be tilted to an angle of approximately 45° before it will fall backward if released, and when released will gently return to its normal position. The cart can be rotated throughout a range of approximately 35° without being very much out of balance, which means that the weight is almost wholly sustained by the axles and not by the user. The axles can be changed to various sets of axle openings to compensate for the lading of the cart. The cart is therefore very easy to pull because only a pulling force is applied to the handles and a very light steadying force only is needed to retain the cart in proper balance.

Operation of the device will be readily and quickly understood from the foregoing description and when the golf clubs are placed in position for use in the caddy cart, the wood clubs preferably are placed behind the axle in the position as shown, with the shafts extended through the cords 48, 48 in a horizontal direction and turned at an angle of 90°, which produces a looped effect around the shafts of the golf clubs, thereby holding them in position until it is desired to remove them from the cart. When they are to be removed, the clubs are lifted in a slightly vertical direction and turned in a reverse direction and pulled out of the loops horizontally, so that the removal and replacement of the clubs is very easily and quickly accomplished. The iron clubs are placed in the forward position of the cart in spaced lateral relation with each other, with their heads downward, and when placed in position the shafts are pushed into the slots in the holders 49 and 50, preferably made of elastic material so these clubs are firmly held in position during the transporting of the clubs in the cart. The balanced arrangement of the clubs provides a cart which is much more stable and one capable of resisting a strong wind which often sweeps across a course while the player is playing golf or when the cart is left standing alongside of the greens during putting operation, so that its resistance to the wind is much more stable than the usual golf cart and cannot be easily overturned.

Also it will be noted that the one side of the caddy cart is somewhat angularly disposed, so that a person in seating himself upon the seat 29 in effect tilts the caddy cart in the direction of the seat slightly, so that the base 16 is firmly placed upon the turf, and if the cart is tipped very far in either direction the angular edges of the bottom 16 are forced into the turf, thereby holding the cart against any rolling motion due to a side hill or movement of the player seated upon it, thereby providing a firm chair-like seat upon which the player can rest if he so desires.

Also it will be understood that in transporting the caddy cart in an automobile or the like the wheels can be removed by removal of the cotter pins and slipping the stub axles out of their positions, whereupon the caddy cart can be lifted into a trunk or into the body of an automobile without difficulty and placed in position in the automobile and the wheels placed alongside of it or laid down in the trunk, as may be desired, without the clubs dropping out of the cart or becoming disarranged. Likewise, if a lesser number of clubs is carried than the usual fourteen clubs and it is desired to change the balance of the cart, the axles can be placed in variable adjusted positions in order to secure a proper balance of the cart to enable it to be easily pulled without being tilted so far that if it is released it will upset and fall to the ground.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

What is claimed is:

1. A golf caddy cart comprising in combination a pair of side members having projecting portions at their bottoms at one side thereof and cut away on their opposite sides, the said side members being wider at their tops than at their bottoms whereby one side of each of the said plates extends outwardly from the body of the cart and having inclined edges, a bottom secured to the said side members having compartments therein for the reception of the heads of golf clubs, a closure member secured to the outwardly inclined edges of the said side members, extending to and folded over the tops of the said side members for a partial distance across their tops and having an opening within the top portion, an inner wall member within the said closure member and side members forming a compartment in the said cart, a hinged seat covering the opening within the said closure member and extending to the inclined edges of the said side members whereby the weight of a person borne by the said seat will be substantially transferred to the projecting portions of the said side members at their bottoms, and a handle secured to the said side members.

2. A caddy cart comprising in combination a pair of side panels of greater length at their forward sides than at their rear, each panel having a plurality of spaced axle openings therein, a bottom plate secured to the said side panels at their lower ends, a center panel secured at its sides to the side panels intermediate their front and rear edges whereby front and rear golf club receiving compartments are provided, a front panel secured to the forward edges of the said side panels, axles selectively mounted in the axle openings in the said side panels and wheels on said axles between the said compartments.

3. A caddy cart comprising in combination a pair of side panels of greater length at their forward sides than at their rear, each panel having a plurality of spaced axle openings therein, a bottom plate secured to the said side panels at their lower ends, a center panel secured at its sides to the side panels intermediate their front and rear edges whereby front and rear golf club receiving compartments are provided, a front panel secured to the forward edges of the said side panels, axles selectively mounted in the axle openings in the said side panels, wheels on said axles between the said compartments, a pair of transverse braces secured to said side panels, axle brackets supported by the center plate and the said transverse brackets, the axle brackets having spaced axle receiving openings therein in register with the axle openings in the said side panels, the axle openings in both the side frame members and the brackets being intermediate the limits of the front and rear compartments, axles selectively positioned in said axle openings and wheels on the said axles.

4. A caddy cart comprising in combination a pair of side panels of greater length at their forward sides than at their rear, each panel having a plurality of spaced axle openings therein, a bottom plate secured to the said side panels at their lower ends, a center panel secured at its sides to the side panels intermediate their front and rear edges whereby front and rear golf club receiving compartments are provided, a front panel secured to the forward edges of the said side panels, axles selectively mounted in the axle openings in the said side panels, wheels on said axles between the said compartments, a pair of transverse braces secured to said side panels, axle brackets supported by the center plate and the said transverse brackets, the axle brackets having spaced axle receiving openings therein in register with the axle openings in the said side panels, the axle openings in both the side frame members and the brackets being intermediate the limits of the front and rear compartments, removable axles selectively positioned in said axle openings whereby the axis of rotation of the cart on its axles may be adjusted with respect to the center of gravity of the cart and lading and wheels on the said axles.

References Cited in the file of this patent

UNITED STATES PATENTS

| | | |
|---|---|---|
| D. 134,518 | Bourgin | Dec. 8, 1942 |
| 1,439,392 | Amon | Dec. 19, 1922 |
| 1,581,061 | Johnston | Apr. 13, 1926 |
| 2,236,053 | Caron | Mar. 25, 1941 |
| 2,262,298 | Proctor | Nov. 11, 1941 |
| 2,411,965 | Hartung | Dec. 3, 1946 |
| 2,435,893 | Mall | Feb. 10, 1948 |
| 2,438,078 | Sutphen | Mar. 16, 1948 |
| 2,513,020 | Haney | June 27, 1950 |